United States Patent [19]

Tsushima

[11] Patent Number: 5,063,589
[45] Date of Patent: Nov. 5, 1991

[54] AUTOMATIC TELEPHONE ANSWERING MACHINE WITH RING SIGNAL RESPONSIVE MODE CHANGING ARRANGEMENT

[75] Inventor: Masayuki Tsushima, Chofu, Japan

[73] Assignee: Tandy Electronics Japan, Ltd., Chofu, Japan

[21] Appl. No.: 445,117

[22] Filed: Nov. 30, 1989

Related U.S. Application Data

[63] Continuation of Ser. No. 943,225, Dec. 18, 1986, abandoned.

[30] Foreign Application Priority Data

Dec. 24, 1985 [JP] Japan .................................. 60-198852

[51] Int. Cl.[5] ............................................. H04M 1/64
[52] U.S. Cl. ......................................... 379/82; 379/67; 379/70
[58] Field of Search .................. 379/67, 68, 70, 74–77, 379/79, 82

[56] References Cited

U.S. PATENT DOCUMENTS 4,066,848  1/1978  Darwood ......................... 379/373 X
4,577,063  3/1986  Hanscom et al. ..................... 379/82
4,581,485  4/1986  Bond et al. ............................ 379/82

OTHER PUBLICATIONS

*Telephone Answering System Model 2530 with Total Remote Command Installation and Operating Booklet*, p. 2, Code-A-Phone © 1983.

Primary Examiner—David Trafton
Assistant Examiner—Joseph A. Rhoa
Attorney, Agent, or Firm—Wolf, Greenfield & Sacks

[57] ABSTRACT

An automatic telephone answering machine of the kind employing a microcomputer for switching from one mode of operation to another is arranged to switch from the "stop" mode to the "automatic answer" mode in response to recurring ring signals transmitted during an incoming phone call, provided those signals meet criteria such as duration of ring, length of interval between successive rings, and a minimum period of recurring ring signals. The mode switching arrangement causes the machine to switch to the "automatic answer" mode and then answer the call during the same phone call to enable the caller to confirm by receipt of the machine's outgoing announcement that the mode switch has occurred.

1 Claim, 2 Drawing Sheets 5,063,589

AUTOMATIC TELEPHONE ANSWERING MACHINE WITH RING SIGNAL RESPONSIVE MODE CHANGING ARRANGEMENT

This application is a continuation, of application Ser. No. 06/943,225, filed Dec. 18, 1986, now abandoned.

FIELD OF THE INVENTION

This invention relates in general to machines that automatically answer telephone calls. More particularly, the invention pertains to an arrangement that enables a telephone answering machine to be placed in the automatic answer mode by the transmission of signals from a remote telephone.

BACKGROUND OF THE INVENTION

The conventional telephone answering machine has a "stop" or "off" mode in which the automatic answering function is disabled (as for example when the user is present and desires to answer phone calls himself) and has provisions enabling the machine to be manually placed in the answer mode when it is desired to have the machine automatically answer telephone calls. For those instances where the user leaves his home or office and forgets to switch the machine to the automatic answer mode, some conventional machines have provisions which enable the machine to be placed in the automatic answer mode by calling from a remote telephone. For that purpose, such conventional machines are constructed to detect ringing signals that recur for a longer period than is normal for the usual telephone call where the calling party most often hangs up the phone after four or five rings. Where the ring signals are permitted to recur over a period of about one minute, the conventional machine is constructed to switch to the automatic answer mode a given period after the recurrence of the ring signals has stopped. To ensure that the conventional machine has switched to the automatic answer mode, another call must be made and the caller must then wait for the outgoing announcement to begin.

The essential conditions for the conventional machine to switch to the automatic answer mode are (1) that the ring signals recur over at least a specified minimum period of time (2) that the phone call be terminated, and (3) that a specified time elapse from the cessation of the ring signals before the machine switches to the automatic answer mode. The conventional arrangement necessitates a second phone call to ensure that the change to the automatic answer mode has occurred because the phone will continue to ring so long as the first phone call is in progress—that is, in the conventional arrangement, the switch to the automatic answer mode cannot occur during the first phone call because the calling phone must be hung up to stop the phone from ringing. If the caller does not make the second phone call, then the caller must make certain that the ring signals recur during the first phone call for at least the minimum required time period to insure the subsequent switch to the automatic answer mode.

PRINCIPAL OBJECT OF THE INVENTION

The principal object of the invention is to provide an arrangement in an automatic telephone answering machine that enables a caller to place the machine in the automatic answer mode by a single phone call and enables the caller to ascertain during that same phone call that the machine has switched to the automatic answer mode.

SUMMARY OF THE INVENTION

The automatic telephone answering machine of this invention is of the kind having electrical or electronic means for switching the machine from one mode to another. In accordance with the invention, a ring signal detector in the machine is coupled to an arrangement that generates a mode switching signal when continuously recurring ring signals are received over a specified minimum period while the machine is in the "stop" of "off" mode, provided those recurring ring signals meet certain criteria such as duration of ring and length of interval between successive rings. The mode switching signal can cause the machine to be switched from the "stop" mode to the automatic answer mode even while the initial phone call is in progress.

THE DRAWINGS

DETAILED DESCRIPTION OF PREFERRED EMBODIMENT OF THE INVENTION

Figure 1:
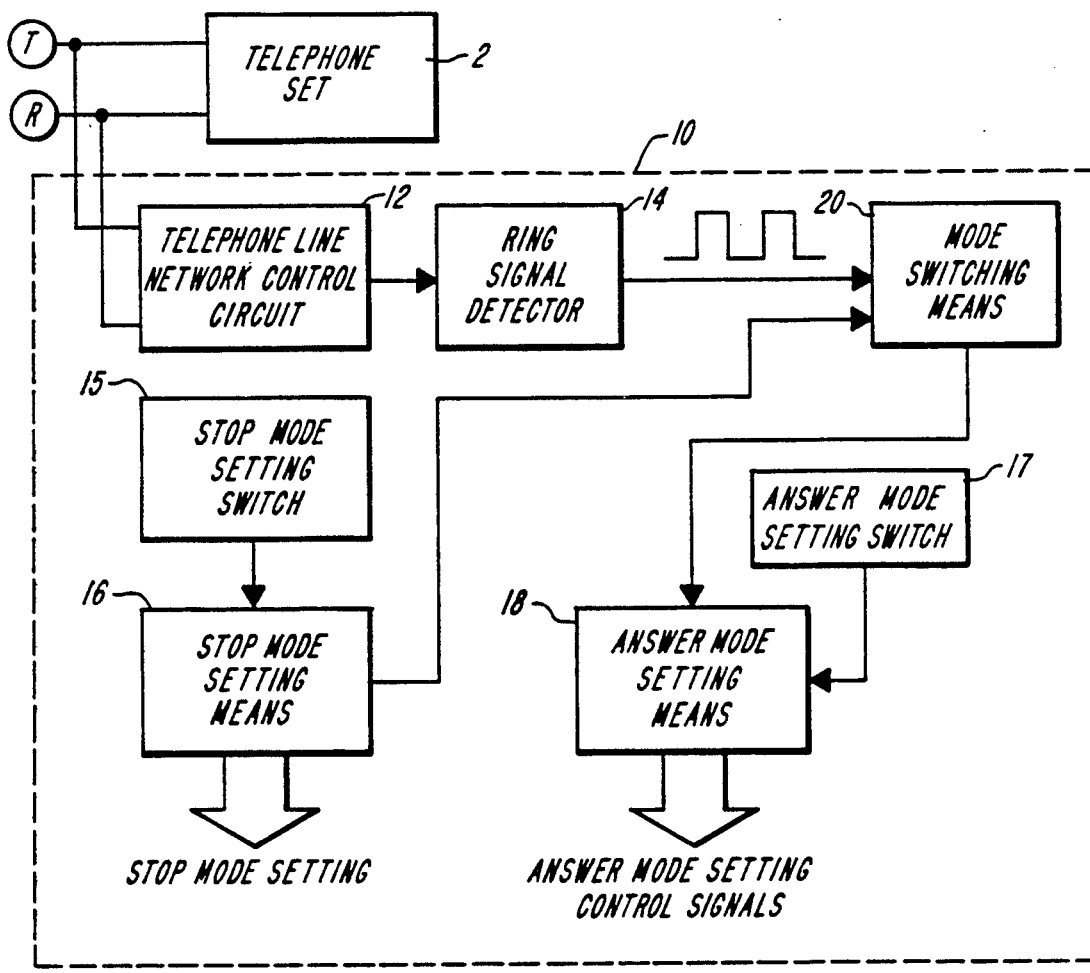
FIG. 1 is a block diagram showing the scheme of the invention.

Referring now to the FIG. 1 block diagram which shows the scheme of the invention, there is indicated a conventional telephone set 2 connected to the tip (T) and ring (T) terminals of the telephone line. The automatic telephone answering machine incorporating the invention is schematically indicated in FIG. 1 by the block 10 and that machine is indicated to be connected in parallel with the telephone set, as is usual. The automatic telephone answering machine has its telephone line network control circuit 12 connected to the line's tip and ring terminals. The output of that control circuit is connected to a ring signal detector 14. The ring signal detector integrates and shapes each A.C. ring signal and emits the shaped ring signals as a train of pulses to a mode switching means 20. The machine is provided with a stop mode setting switch 15 which causes stop mode setting means 16 to generate control signals that set the machine into its stop mode. The machine also has an answer mode setting switch 17 that causes answer mode setting means 18 to generate control signals that set the machine into its automatic answer mode when the switch is actuated. The mode setting switches and the mode setting means may be of the kind conventionally employed in automatic telephone answering machine. In those conventional arrangements, mode switching is accomplished by electrical or electronic arrangements and the device for generating the control signals for setting the requisite mode may be a conventional microcomputer. In the FIG. 1 arrangement, the stop mode setting means 16, in response to actuation of the stop mode setting switch 15, emits a stop mode signal to switching means 20 which enables that means to accept output signals from the detector 14. In the absence of such a stop mode signal (as when the machine is already in the automatic answer mode), the mode switching means 20 is prevented from emitting a mode switching output signal to the answer mode setting means 18. Assuming that a stop mode signal has been sent to switching means 20, the pulse train output of detector 14 is gated into switching means 20 where that switching means ascertains whether the pulse train meets preset criteria. The criteria, for example, may be the duration of each ring, the interval between rings, and a minimum period of time in which the ring signals must recur or a preset number of ring cycles must be counted or may simply be the detection of proper tones in the ring signals.

For ease of exposition, it is here assumed that the machine is arranged to ascertain whether the rings are of the proper duration, whether the interval between rings is proper, and whether the successive rings have occurred within a minimum period of time, before switching means 20 proceeds to emit a switching signal to means 18 to set the machine into its automatic answer mode. When the preset conditions are satisfied, switching means 20 causes the machine to be set in its automatic answer mode. Assuming the phone is not hung up, ring signals continue to be transmitted to the machine after occurrence of the change to the automatic answer mode. The machine then answers in its customary manner by seizing the phone line and transmitting its announcement to the caller. The caller upon hearing the start of the outgoing announcement may then hang up the phone with the sure knowledge that the machine has switched to the automatic answer mode.

The preferred embodiment of an automatic telephone answering machine according to the present invention will now be described with the aid of FIGS. 2 and 3. In this embodiment, a microcomputer 22 is used to implement certain elements of the scheme shown in FIG. 1, such as the stop mode setting means 16, the answer mode setting means 18, and the switching means 20. In the FIG. 1 scheme, the network control circuit 12 includes a circuit which couples the ring signal from the telephone line to the ring signal detector 14. Also, the circuit 12 includes a line seizing switch and sound transmitting and receiving circuitry. The ring signal detector 14 has a circuit which integrates and shapes the received ring signal to provide a pulse for each ring. One cycle of the ring signal pulse is composed of a high level portion corresponding to the tone portion (having a duration of, for example, one second in Japan, two seconds in the U.S.) and a low level portion corresponding to the silent portion (having a duration of, for example, two seconds in Japan, four seconds in the U.S.)

Figure 2:
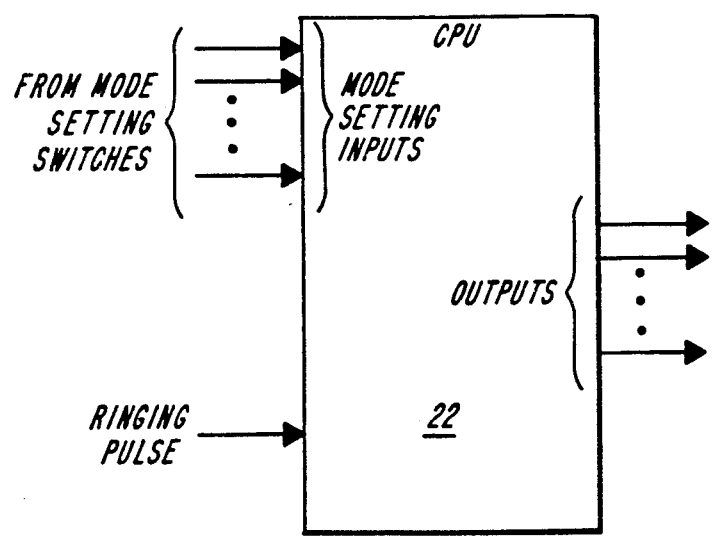
FIG. 2 shows some of the inputs and outputs of a typical 4-bit microcomputer.
Figure 3:
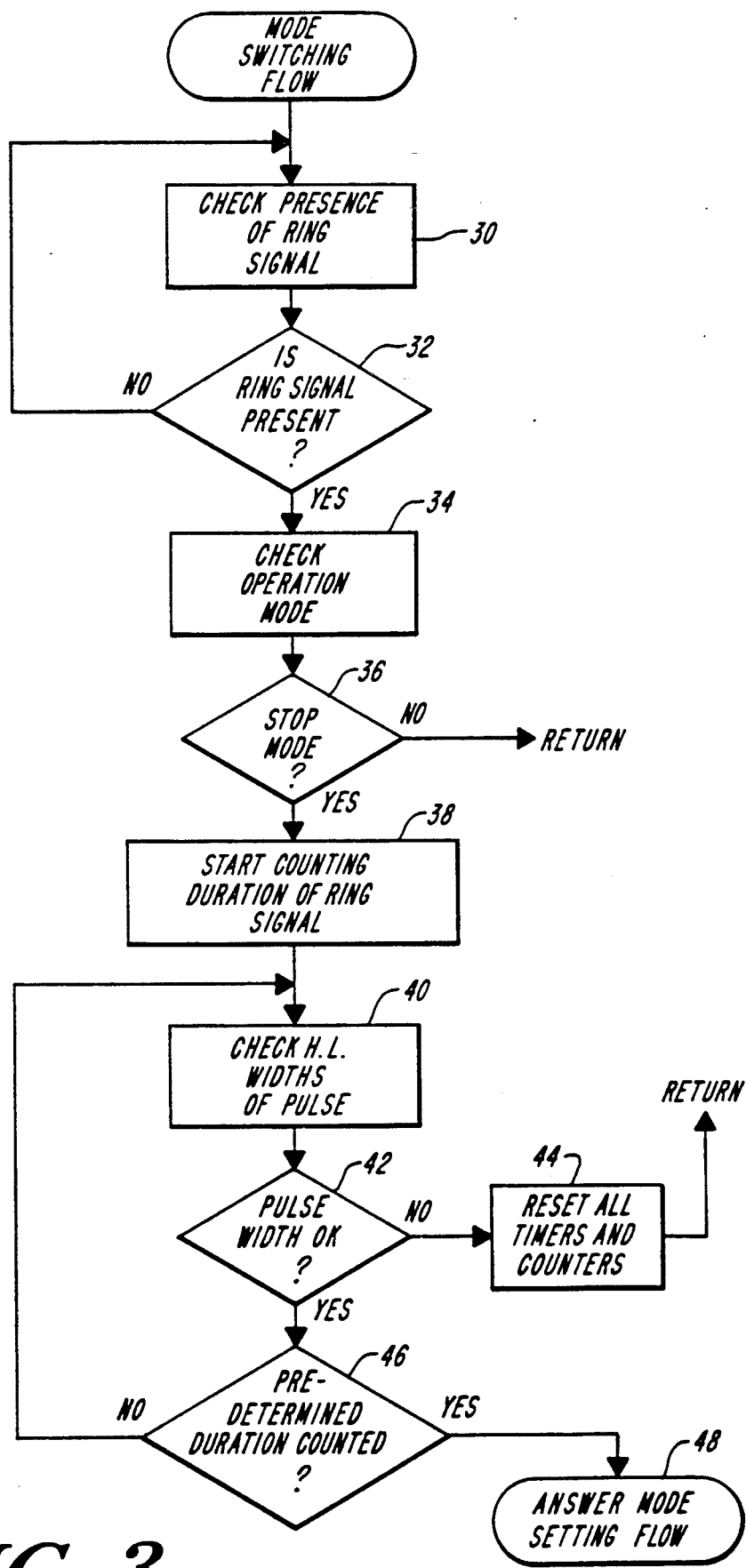
FIG. 3 is a chart showing the mode switching flow occurring in a microcomputer employed in the invention.

The microcomputer 22 (for example, 4-bit microcomputer HMCS44C by Hitachi, Ltd.) shown in FIG. 2 has an input which receives the train of pulses derived from the ring signals. The microcomputer 22 also has input terminals which receive input signals from the mode setting switches 15 and 17. The automatic telephone answering machine normally has a plurality of operational modes. In this embodiment, the machine has a stop mode in which the automatic telephone answering function is disabled and an answer mode in which predetermined automatic answering actions are performed, such as waiting for incoming calls, seizing the phone line upon detection of ring signals, thereupon transmitting a prerecorded announcement, and then recording the incoming message. In addition to the stop and automatic answer modes there is a "play" mode for playing the tape, a "rewind" mode for rewinding the tape, a "record" mode for recording the incoming message, and an "announce only" mode for transmitting the outgoing announcement without permitting the recording of an incoming message.

When one of those modes is selected by actuating the appropriate mode setting switch, the microcomputer 22 performs the necessary operations and produces the requisite control signals at its output terminals to set the automatic telephone answering machine 10 to the selected mode. The control signals are used for example, to control a tape device (not shown), a display device (not shown), and the telephone line network control circuit 12, as predetermined.

A mode switching flow executed by the microcomputer 22 will now be described with the aid of the FIG. 3 chart. Firstly, in step 30, the presence of a ring signal is checked. This is done by ascertaining whether the pulse input terminal of switching means 20 is at a high level or a low level. In step 32, if the level is low, it is decided that the ring signal is absent and the flow reverts to step 30. If the level is high in step 32, it is decided that the ring signal is present and the flow proceeds to step 34 in which a mode check is made by ascertaining whether a flag has been set by the stop mode signal emitted by mode setting means 16. In step 36, if the stop mode flag is set, the flow proceeds to step 38, but if the flag is not set, the flow reverts to the main flow or proceeds to process another mode such as the automatic answer mode or the announce only mode. If the stop mode flag is set, in step 38, a count of the duration of the time period in which the ring signals recur is started by triggering a counter in microcomputer 22. Thereafter the flow proceeds to step 40 in which it is decided whether the received ring signal pulse is adequate or not by checking the duration of the pulse. In that step, the high level portion of the pulse is counted to find out if, for example, it is two seconds or shorter, and the low level portion of the pulse is counted to find out if it is four seconds or shorter. Then, in step 42, when the high level portion exceeds two seconds or the low level portion exceeds four seconds, it is decided that an abnormal condition has occurred or that the caller has hung up the telephone and the flow proceeds to step 44. In step 44, all the timers and counters including the one which counts the time duration of the recurring ring signals, the high level counter, and the low level counter are reset and the flow reverts to the main flow. In step 42, on the other hand, if the pulse width is determined to be adequate because of the high level duration of two seconds or less and the silent period is determined to be adequate because of the low level duration of four seconds or less, the flow proceeds to decision step 46. In step 46, it is decided whether or not the counter which counts the time duration in which the rings recur has reached a count representing a predetermined duration. The predetermined duration is preferably selected to be longer than the length of time for which a person other than the user is likely to continue ringing when making a normal call. That predetermined time period may, for example, be 90 seconds.

In step 46, if it is determined that the count is below the predetermined duration count, the flow reverts to step 40 for continued checking of the pulse width. On the other hand, if it is decided that the count has reached the predetermined count, the flow proceeds to step 48 for execution of an answer mode setting flow. That flow may be identical with the flow executed by the microcomputer upon the activation of the answer mode setting switch 17. By execution of that flow in step 48, the automatic telephone answering system 10 is set to the answer mode. With the present invention, where the user continues his call after the system has been set to the answer mode, the system answers as it would a normal phone call by seizing the line and transmitting the outgoing announcement. The user thus can easily confirm by his receipt of the announcement that the machine has switched to the answer mode.

The embodiment of the invention herein described may readily be modified without departing from the essence of the invention. For example, a mode switching condition may be changed from a predetermined period in which ring signals must recur to a predetermined number of cycles of the ring signal. This change can be entered in the FIG. 3 flow chart by changing step 38 to "start counting the number of cycles of the ring signal" and step 46 to "predetermined number of cycles counted?". The predetermined number of cycles may, for example, be 30 ring cycles which is equivalent to a 90-second duration of recurring ring signals (assuming a three second ring cycle). As another example, in the mode switching flow of FIG. 3, the checks in step 30 and 34 may be executed in the main flow, rather than in the switching flow.

I claim:

1. A telephone answering machine capable of being remotely activated comprising:
   (a) switch means for selectively setting the machine in one of a plurality of modes in each of which the machine is powered on and operational, which modes include a stop mode in which the machine does not answer incoming calls and an automatic answer mode in which the machine answers incoming calls and records incoming messages,
   (b) means for answering incoming calls when said machine is in said automatic answer mode,
   (c) a microcomputer responsive to actuation of said switch means for providing control signals which set the machine in the selected mode,
   (d) a ring signal detector for providing a train of output pulses derived from detected ring signals, each of said pulses having a first signal level generated when said ring signal detector detects ringing voltage and a second signal level when said ring signal detector detects telephone line voltage,
   (e) stop mode setting means in the microcomputer for providing a stop signal when the machine is in the stop mode,
   (f) mode switching means having a first input coupled to the output of the ring signal detector and a second input coupled to said stop mode setting means to receive said stop signal, said mode switching means comprising means for determining the duration of said first and second levels of said pulses, said mode switching means being responsive to said determining means to operate a counter means which counts the duration of said detected ring signals, for generating a mode switching output signal responsive to said counter reaching a specified count and said stop signal being provided, and
   (g) answer mode setting means in said microcomputer responsive to said mode switching output signal from the mode switching means for setting the machine in the automatic answer mode, whereby the machine is able during the same incoming phone call to switch from the stop mode to the automatic answer mode and then answer the telephone call.

* * * * *